United States Patent
Flood et al.

(10) Patent No.: US 6,560,619 B1
(45) Date of Patent: May 6, 2003

(54) USING ATOMIC COMPARE-AND-SWAP OPERATIONS FOR FORWARDING-POINTER INSTALLATION

(75) Inventors: Christine H. Flood, Westford, MA (US); Ole Agesen, Needham, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 288 days.

(21) Appl. No.: 09/704,141

(22) Filed: Nov. 1, 2000

Related U.S. Application Data (60) Provisional application No. 60/204,184, filed on May 15, 2000.

(51) Int. Cl.$^7$ .................... G06F 12/00; G06F 17/30
(52) U.S. Cl. ................................. 707/206; 707/205
(58) Field of Search ............................. 707/206, 200, 707/205

(56) References Cited

U.S. PATENT DOCUMENTS

| | | | |
|---|---|---|---|
| 4,584,640 A | | 4/1986 | MacGregor et al. |
| 4,775,932 A | * | 10/1988 | Oxley et al. ............... 707/206 |
| 5,355,483 A | * | 10/1994 | Serlet ......................... 711/154 |
| 5,692,185 A | * | 11/1997 | Nilsen et al. ............ 707/104.1 |
| 6,415,302 B1 | * | 7/2002 | Garthwaite et al. ......... 707/206 |

OTHER PUBLICATIONS

David A. Moon, "Garbage Collection in a Large Lisp System", 1984, ACM, pp. 235–246.*
Martin Rudalics, "Distributed Copying Garbage Collection", 1986, ACM, pp. 364–372.*
International Search Report, International Application No. PCT/US 01/15589 (all pages).
Bibolet, R.P. and Malik, W.J., Asynchronous Service Routine Invocation with Safely Serialized Work Queue, IBM Technical Disclosure Bulletin, vol. 25, No. 8, IBM Corporation, Jan. 1983, pp. 4091–4092.

(List continued on next page.)

*Primary Examiner*—Greta Robinson
*Assistant Examiner*—Linh Black
(74) *Attorney, Agent, or Firm*—Cesari and McKenna, LLP; Edwin H. Paul, Esq.

(57) ABSTRACT

A multiprocessor, multi-program, stop-the-world garbage collection program is described. The system initially over partitions the root sources, and then iteratively employs static and dynamic work balancing. Garbage collection threads compete dynamically for the initial partitions. Work stealing double-ended queues, where contention is reduced, are described to provide dynamic load balancing among the threads. Contention is resolved by using atomic instructions. The heap is broken into a young and an old generation where parallel semi-space copying is used to collect the young generation and parallel mark-compacting the old generation. Speed and efficiency of collection is enhanced by use of card tables and linking objects, and overflow conditions are efficiently handled by linking using class pointers. The garbage collection termination employs a global status word.

8 Claims, 7 Drawing Sheets

OTHER PUBLICATIONS

Massalin, H. and Calton, P., A Lock–Free Multiprocessor OS Kernel, Department of Computer Science, Columbia University Technical Report No. CUCS–005–91, Jun. 19, 1991, pp. 1–19.

Arora, Nimar S. et al. "Thread Scheduling for Multiprogrammed Multiprocessors", Department of Computer Science, University of Texas at Austin (1998), pp. 1–11.

Blelloch, Guy E. et al. "On Bounding Time and Space for Multiprocessor Garbage Collection", Computer Science Department, Carnegie Mellon University, pp. 1–14.

Blumofe, Robert D. "Scheduling Multithreaded Computations by Work Stealing", University of Texas at Austin (1998), pp. 1–34.

Courtemanche, Anthony James "MultiTrash, a Parallel Garbage Collector for MultiScheme", Thesis for Massachusetts Institute of Technology (1986), pp. 1–47.

Doligez, Damien, et al. "Portable, Unobtrusive Garbage Collection for Multiprocessor Systems", Association for Computing Machinery (1994), pp. 70–83.

Endo, Toshio, et al. "A Scalable Mark–Sweep Garbage Collector on Large–Scale Shared–Memory Machines", Department of Information Science, University of Tokyo, pp. 1–16.

Halstead, Robert H. Jr., "Implementation of Multilisp: Lisp on a Multiprocessor", M.I.T. Laboratory for Computer Science, Cambridge, MA (1984), pp. 9–17.

Wilson, Paul R. "Uniprocessor Garbage Collection Techniques", University of Texas at Austin, 1992, pp. 1–34.

Yamamoto, Hirotaka, et al. "Comparing Reference Counting and Global Mark–and–Sweep on Parallel Computers", Department of Information Science, University of Tokyo, Japan, Section: 1–6, pp. 1–14.

\* cited by examiner

FIG. 9C

USING ATOMIC COMPARE-AND-SWAP OPERATIONS FOR FORWARDING-POINTER INSTALLATION

CROSS REFERENCE TO RELATED APPLICATIONS

This application is related to and claims priority from Provisional Application, Serial No. 60/204,184, filed on May 15, 2000, and entitled "Parallel Garbage Collection for Shared Memory Multiprocessors."

This application is also closely related to commonly assigned U.S. applications of Christine H. Flood et al. entitled: Work Stealing Queues for Parallel Garbage Collection; Local Allocation Buffers for Parallel Garbage Collection; and Striding—Type Generation Scanning for parallel Garbage Collection, all such applications being co-filed with this application.

BACKGROUND OF THE INVENTION

1. Field of the Invention

The present invention relates to memory management particularly with the aspect of memory management that has become known as "garbage collection." More particularly the present invention relates to garbage collection in systems having multiple processors sharing memory.

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. An object may belong to a class, which is an organizational entity that may contain method code or other information shared by all objects belonging to that class. In the discussion that follows, though, the term object will not be limited to such structures; it will additionally include structures with which methods and classes are not associated.

Modern programs often run on systems using many processors and dynamically generate objects that are stored in a part of memory referred to in the field.as the "heap." Although there are some different uses of the term, the discussion that follows will use heap to refer to shared memory managed by automatic garbage collection. The garbage collector has control of and/or direct access and/or knowledge of the addresses, classes, is roots, and other such detailed information about all live objects created in the system.

After an object is no longer needed, it sometimes becomes necessary to reclaim the memory allocated to the object in order to prevent the system from running out of memory as more and more temporary objects fill the heap. Such memory reclaiming is referred to as "garbage collection," or GC. Known GC is well described by Richard Jones and Rafael Lins in their book, "Garbage Collection Algorithms for Automatic Dynamic Memory Management," published by John Wiley and Sons, 1996. This book is incorporated herein by reference. A brief description of known GC systems and techniques follows.

Garbage collectors operate by reclaiming space that is no longer "reachable." Statically allocated objects represented by a program's global variables are normally considered reachable throughout a program's life. Such objects are not ordinarily stored in the garbage collector's managed memory space, but they may contain references to dynamically allocated objects that are, and such dynamically allocated objects are considered reachable, too. Clearly, objects referred to in the execution threads' call stack are reachable, as are the objects referred to by register contents. And an object referred to by any reachable object is also reachable.

The use of automatic garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use by that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable.

Garbage-collection mechanisms can be implemented in a wide range of combinations of hardware and/or software. As is true of most of the garbage-collection techniques described in the literature, the present invention makes use of and is applicable to most such systems.

To distinguish the part of the program that does "useful" work from that which does the garbage collection, the term mutator is sometimes used in discussions of these effects; from the collector's point of view, what the mutator does is mutate active data structures' connectivity. Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object allocation includes steps for finding space occupied by objects whose reference count has fallen to zero. Obviously, such an approach can slow mutator operation significantly.

Other, "stop-the-world" GC approaches use somewhat less interleaving. The mutator still typically allocates space within the heap by invoking the garbage collector, for example, and the garbage collector, at some level, manages access to the heap. Basically, the mutator asks the garbage collector for a pointer to a heap region where it can safely place the object's data. The garbage collector keeps track of the fact that the thus-allocated region is occupied, and it will refrain from allocating that region in response to any other request until it determines that the mutator no longer needs the region allocated to that object. In stop-the-world collectors, the task of memory reclamation is performed during separate garbage collection cycles. In such cycles the collector interrupts the mutator process, finds unreachable objects, and reclaims their memory space for reuse. As explained later when discussing "card tables," the GC's finding of unreachable objects is facilitated by the mutator recording where in memory changes have been made.

Garbage collectors vary as to which objects they consider reachable and unreachable. For the present discussion, though, an object will be considered "reachable" if it is referred to by a reference in a root. The root set includes, for instance, reference values stored in the mutator's threads' call stacks, the CPU registers, and global variables outside the garbage-collected heap. An object is also reachable if it is referred to by another reachable object. Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing objects pointed to from a root, tracing objects pointed to from those reachable objects, and so on until all the referenced or pointed to objects are found and are retained. Thus the last objects found will have no pointers to other untraced objects. In this way unreachable objects are in effect discarded and their memory space becomes free for alternative use.

However, such free space is more useful when it is compacted than when it is distributed in a fragmented way throughout the heap. Compaction increases the data's "locality of reference." This increases cache hits and therefore cache performance. To compact free space, many garbage collectors may relocate reachable objects. In one known technique the heap is partitioned into two halves, hereafter called "semi-spaces." Between any two garbage-collection cycles, all objects are allocated in one semi-space ("from" space), leaving the other semi-space ("to" space) free. When the garbage-collection cycle occurs, objects identified as reachable are "evacuated," i.e., copied compactly into the "to" semi-space from the "from" semi-space, which is then considered free. Once the garbage-collection cycle has occurred, the designations "from" and "to" are interchanged for the next GC cycle. Any new objects will be allocated in the newly labeled "from" semi-space until the next GC cycle.

Although this relocation requires the extra steps of copying the reachable objects and updating references to them, it tends to be quite time and code efficient, since most new objects quickly become unreachable, so most of the current semi-space is actually garbage. That is, only a relatively few, reachable objects need to be relocated, after which the entire semi-space contains only garbage and can be pronounced free for reallocation. One limitation of this technique is that half the memory so used is unusable for storing newly created objects.

A way of not only reducing collection-cycle length but also increasing overall efficiency is to segregate the heap into one or more parts, called generations, that are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive." But generational collection greatly increases what is effectively the root set for a given generation since references to objects in one generation may be found in another generation, and thus other generations must be searched to uncover such references.

Figure 1:
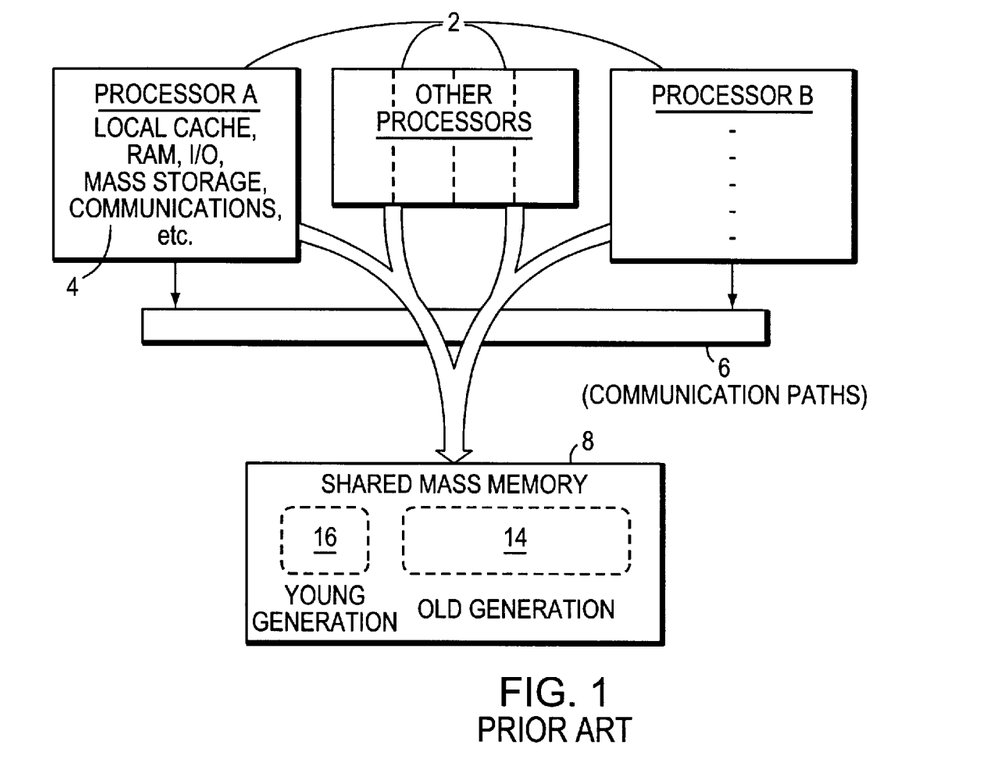
FIG. 1 is a circuit block diagram of a physical hardware system suitable for implementing the present invention.
Figure 2:
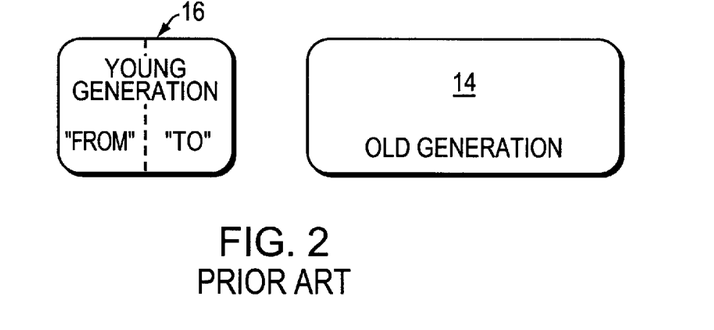
FIG. 2 is a block diagram of the organization of the heap of FIG. 1.

Consider FIGS. 1 and 2, which depict a heap as organized into an old generation 14 and a young generation 16. With such a partition, the system may take advantage of a copy type GC's simplicity in managing the young generation because the unused half memory is relatively small. But, for the "old" generation, which uses the great majority of the memory, using only half for storage may not be practical. So a different approach may be used. Among the possibilities are the mark-sweep and mark-compact described in the above referenced book by Richard Jones and Rafael Lins.

In multiprocessor systems, one approach to speeding up garbage collections is to "parallelize" the GC process by involving any idle processors in the garbage collection task. Toshido Endo et al. in their paper, "A Scalable Mark-Sweep Garbage Collector on Large Scale Shared-Memory Machines," published in the Proceedings of High Performance Networking and Computing (SC97) in 1997 describes such a system. This approach includes copying the work to lockable auxiliary queues from which work may be stolen. A thread whose queue is empty looks for a queue with work, locks that queue and steals half the elements from the locked queue.

SUMMARY OF THE INVENTION

The advantages of the present invention are achieved in a parallel infrastructure garbage collection system that resolves contention among garbage collection threads that are all charged with copying a particular work task.

Since a common work task can be referenced from several other work tasks, several GC threads may be asynchronously contending with each other to copy the same work task from its present memory address to memory address that is specific to each of the GC threads.

The present invention provides for a work task to be formatted with its present address contained in a location within the work task data structure, often in the header. This present address can be used to ensure that the work task will be copied once and that other GC threads that access the work task are informed of the prior copying and also where the other threads may update their pointers to the new location of the work task.

When one of the threads accesses the work task in a first address in order to copy it, the thread executes an atomic instruction, as discussed herein, preferably a compare-and-swap type. This type of instruction returns the work task's present address from the header to the executing thread. The atomic instruction also compares the returned address with the first address, and if the two are the same, the thread determines that the work task has not yet been copied, and so the thread updates the present address in the work task header to the new address and copies the work tasks to a new address. The atomic instruction continues by replacing the present address within the work task's header at the first address with the new address. At this point the first address and the address in the work task's header will not be the same.

When a second thread executes the same atomic instruction on the first address the new address is returned. The two are not identical and, by this, the second thread "knows" that the work task was copied by another thread.

If the second thread retains a pointer to the work task, the second thread will update its pointer to the new address.

BRIEF DESCRIPTION OF THE DRAWINGS.

Other objects, features and advantages will be apparent from the following detailed description of preferred embodiments thereof taken in conjunction with the accompanying drawings in which.

DETAILED DESCRIPTION OF AN ILLUSTRATIVE EMBODIMENT

FIG. 1 is a hardware block diagram of a multiprocessor computing system in which a number of processors 2 share common memory 8. Each processor may also have local RAM, cache, and mass storage, as well as communications and I/O devices. In addition there may be local communications paths 6 between the processors in the form of common busses, LAN's, or the like.

FIG. 1 depicts shared memory 8 as separate from memory disposed more locally to the individual processors, but this is not a necessary multiprocessor configuration. There may be a controller (not shown) for this shared memory in some embodiments. The operating system partitions the shared memory space into several sections, one being the "heap." The heap is where space is allocated to objects dynamically under the control of a garbage collector. The heap itself is divided into two sections, referred to herein as the old generation 14 and the young generation 16. However, in other preferred embodiments, the heap may be divided into more than two sections. The old generation stores objects that have persisted (after a few young generation garbage collections), and the young generation stores newly created objects.

One or more operations in a GC cycle will normally be of the type in which the number of identifiable tasks to be performed expands dynamically. One such operation is that of identifying and relocating reachable objects, as a GC may do for, say, the young generation. This operation starts with the tasks of identifying the objects to which root references point. These tasks are statically identified before the GC operation begins. But other tasks are identifiable by the GC only dynamically, i.e., in the course of performing previous tasks. In the course of performing the statically identified tasks, for instance, the GC threads will find reachable objects and in doing so identify the tasks of finding objects referenced by those reachable objects.

Figure 3:
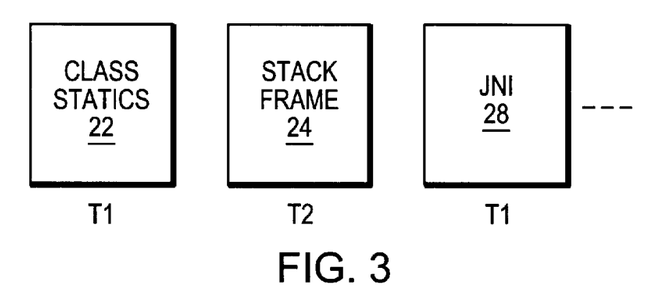
FIG. 3 is a pictorial view of typical sources of roots of live objects.

In the illustrated embodiment, the collector divides initial, statically identifiable tasks into task groups. In the specific case in which the tasks are the processing of roots to find reachable objects, a convenient way to divide the tasks into groups is to group them in accordance with what their sources are. With reference to FIG. 3, typical sources are: JAVA™ classes (class statics), stack frames, and native language interface roots (JNI). (JAVA is a trademark or registered trademark of Sun Microsystems, Inc. in the United States and other countries.)

When these tasks have been divided into groups, the groups are assigned, in a manner presently to be described to respective GC threads. After a GC thread has been assigned one or more such static task groups, it begins performing the tasks in its group or groups. By performing those tasks, the GC thread dynamically identifies further tasks to perform. In the specific case in which the operation is that of young-generation reachable-object identification, the further tasks can be associated with respective reachable objects, because the tasks are following those objects' references to identify further reachable objects.

In accordance with the present invention, as shown in FIGS. 4a, 4b, 4c and 4d, each GC thread has a respective work queue 30 to keep track of these further tasks. As it dynamically identifies such tasks, the thread places into its work queue entries for each such task. In the case of the reachable-object-identification operation, for example, a convenient type of work queue entry is a pointer to the reachable object that the GC thread has found. That pointer will represent the task of following pointed-to objects' references to find further reachable objects.

Of course, other task granularities are possible. A separate entry could be made for each reference in a newly identified reachable object, for example.

As will be discussed further below, a GC thread performs the tasks in its work queue until that queue is empty, and it then searches other threads' queues for tasks to steal and perform, as will be also explained in more detail. Before addressing that "work-stealing" feature, though, task-group assignment is discussed in more detail.

A competition is one preferred way of assigning groups to threads. That is, the GC threads can take-turns claiming task groups that other threads have not yet claimed. For this purpose, the GC would maintain a flag associated with each task group to indicate whether that task group has been claimed.

A convenient way to synchronize task-group claiming is for the GC thread to use an atomic "test-and-set" operation. In an atomic test-and-set operation, a processor atomically reads an old value from a location and writes a new value into that location. For task-group claiming, the thread performs a "test-and-set" operation on the location of a task group's flag, and the new value to which the flag is set is one that indicates that the task group has been claimed. If the flag's old value indicated that the task group had already been claimed, then the thread concludes that it was not successful in claiming the task group. Otherwise, it concludes that it was successful, and it will process that task group.

Preferably, there are more task groups than GC threads, e.g., four times as many task groups as threads, so some or all the threads claim more than one task group. Preferably each GC thread will claim a further task group only after it has finished processing the previously claimed task group. In any event, the processing often results in identification of new tasks to be performed, and a thread adds such tasks to its work queue by pushing an identifier of the newly identified task onto the bottom of its work queue.

Having a smaller number of GC threads claim a larger number of task groups works initially to balance the work of each thread. But, as the threads process the tasks, some tasks will lead to identifying a large number of tasks while others will lead to identifying few or none. In the case where the tasks to be performed are those of following references to reachable objects, some objects may refer to no other objects, while others may refer to many. So the load could become unbalanced if no control measures were taken.

Figure 4A:
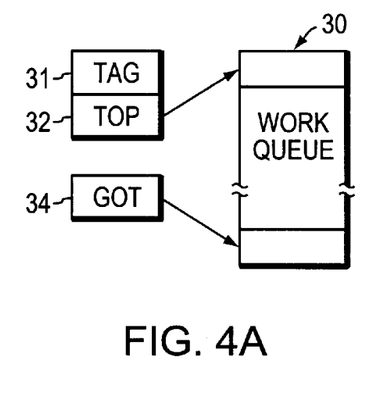
FIGS. 4a–4d are sequential diagrams of the organization of queues, dynamic stealing, and linking of overflow pointers.
Figure 4B:
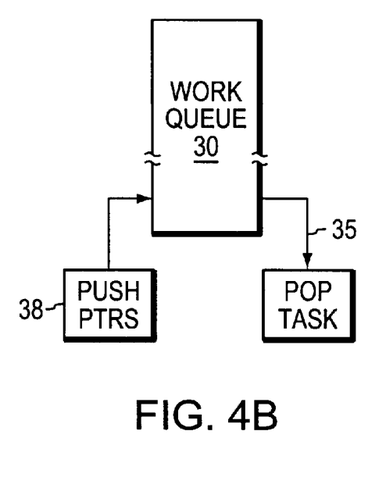
Figure 4C:
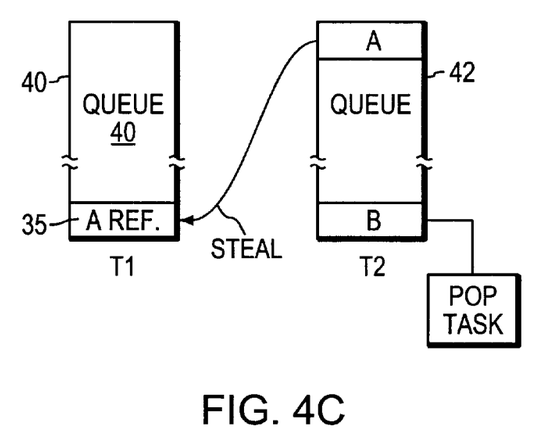

The present invention dynamically balances the work among the available threads. For that purpose, it employs what was referred to above as "work-stealing." The basic technique of dynamic work stealing queues is described in a paper by Nimar S. Arora et al., entitled "Thread Scheduling for Multiprogrammed Multiprocessors," from the Proceedings of the Tenth Annual ACM Symposium on Parallel Algorithms and Architectures, 1998. This paper is hereby incorporated herein by reference. In the present application FIGS. 4a–4c illustrate the work stealing technique. As mentioned above, each thread places into its respective work queue entries representing tasks that it has newly identified. In the reachable-object-identification operation, in which the GC thread scans each newly identified object for references to further objects, one possible form for such an entry to take is that of the further-object-identifying references itself. In the work queue, such a reference represents a task that may include steps such as scanning the further object for references, relocating the object, performing necessary reference updating, etc.

Referencing FIG. 4b, the GC thread pushes newly found references 38 onto one end, which is arbitrarily referred to as the bottom, of its work queue 30 for later processing. When the thread is ready to perform a task from its queue, it will pop a reference 36 from the bottom of the queue and perform the represented task.

Control of the queue is implemented, with reference to FIG. 4a, in a preferred embodiment, with an index 32 pointing to the next entry to be popped from the top of the queue and an index 34 pointing to the location where the next entry should be added to the bottom of the queue. In addition there is a tag 31 that, in this preferred embodiment, is used to control the operations of the queue as discussed below. The GC thread associated with the queue increments the bottom index when it pushes a task identifier onto its queue, and it decrements that index when it pops an identifier from it.

Now, the GC thread makes work queue entries only for objects that still need processing. If all of a newly identified reachable object's references refer only to objects that have already been processed, that object's processing results in no further work-queue entries. So a GC thread may reach a point at which its queue has no more entries. When this happens, the thread will "steal" work if it can from other GC threads' queues. Such stealing threads use the top index 32 and tag 31 of the queue to be stolen from because those threads pop entries from the top of the queue, rather than from the bottom, as the queue's "owner" thread does.

We now describe one way to implement such queues by reference to sample simplified code, with designation "popTop" (for the top-popping), "popBottom "(for bottom-popping), and "pushBottom" (for bottom-pushing). First we consider popTop, which stealing threads perform as shown in FIG. 4c. To understand the tag field's purpose, it helps first to consider in detail how the step of popping the queue from the top would be performed without the tag field. The following is illustrative sample code that performs popTop by a stealing thread.

Worktask*popTop( )

```
    {
1       oldAge = age;
2       localBot = bot;
3       if(localBot <= oldAge.top)
4       returnNULL;
5       task = deq[oldAge.top];
6       newAge = oldAge;
7       newAge.top++;
8       cas(age, oldAge, newAge);/*atomic compare-and-swap*/
9       if(oldAge == newAge)
10      return task;
11      return NULL;
    }
```

To "steal" from the top of another thread's work queue, the stealing thread first reads that queue's top index, as line 1 above indicates, to find where its top entry is. In the illustrated embodiment, the tag field and the top index are part of the same word, i.e., are in a group of bits ("age" in the sample code) that can be accessed in a single machine-level operation, such as a load, store, or an atomic compare-and-swap operation. (As was mentioned above, the tag would be read in the same operation, but this will be discussed below.) It then reads the thus-identified queue entry and reads the bottom index to make sure that the bottom index is not less than or the same as the top index, i.e., that the queue is not empty. As line 3 and 4 above indicate, the stealing thread will not pop the top of the queue if the queue is empty.

Otherwise the stealing thread reads the top-index identified queue entry. But the stealing thread does not immediately perform the task that the queue entry identifies. This is because, after it has read the top index, the stealing thread may be suspended after reading the location to which the top entry points but before it increments the top index to indicate that it has claimed the task. If so, a second stealing thread may pop the top entry in the interim, and the first stealing thread could then end up attempting to process an object that the second thread had already processed. So, before it actually performs the task, the stealing thread performs an atomic compare-and-swap operation, as line 8 indicates, in which it effectively pops the top queue entry by incrementing the top index 32 if that index's value is still the same (indicating that there was no second stealing thread pop) as the one the stealing thread used to read the top queue entry. As line 9 indicates, this storing operation is actually performed on the entire word including the top 31 and the tag 32 of FIG. 4a rather than only on the top field, for reasons that we will turn to below.

The operation of the CAS (compare and swap) instruction above is more easily understood by the following short noted code:

```
newAge = CAS(newAge, oldAge, &dq-age)/* this checks the contents of
                                        dq->age. If it is equal to the value of
                                        oldAge, then dq- is set to newAge
                                        and oldAge is returned.*/
If (newAge == oldAge) {
            /*The CAS succeeded*/
} else {
    /* The CAS failed */
}
```

If the stealing thread thereby successfully pops the queue, i.e., if the absence of a top-index-value change enabled it to increment the top index, it proceeds to perform the task from line 10 above that the top entry indicated. With reference to FIG. 4c, if thread T1 steals from the queue 42 of thread T2, the successfully stolen task may contain a reference 35 which is stored on the stealing threads queue 40 for later processing. If a top index field change did occur, though, another thread has presumably already popped the queue entry. So, line 11 returns "NULL" value and the first stealing thread concludes that it has not popped the top entry successfully, and it neither increments the top index (as part of the compare-and-swap operation) nor performs the task that the queue entry represents.

Thus employing an atomic compare-and-swap operation protects the pop operation's integrity from interference by other stealing threads. Without more, though, the top-popping operation would still be vulnerable to interference from the (bottom-popping) owner thread. To understand this, first consider how the owner thread pushes queue entries.

Unlike stealing threads, the owner thread pushes and later pops entries from the bottom of the queue. As the following sample code illustrates for pushBottom, pushing a queue entry is simply a matter of reading the bottom index (bot), writing an entry identifier of a work task (wkt) into the location that the bottom entry indicates, and incrementing the bottom index:

void pushBottom(Worktask*wkt)

```
          {
    1       localBot = bot;
    2       deq[localBot] = wkt;
    3       localBot++;
    4       bot = localBot;
          }
```

Since a stealing thread will not pop an entry if the top index equals the bottom index (step 3 below), and since the owner thread is the only thread that pushes or pops entries at the bottom of the queue, there is no need to take special precautions against interference by other, stealing GC threads.

As the following sample code indicates, popBottom—popping an entry from the bottom of the queue is more complicated than pushing an entry there.
Worktask*popBottom( )

```
              {
    1           localBot = bot;
    2           if(localBot == 0)
    3             return NULL;
    4           localBot--;
    5           bot = localBot;
    6           wkt = deq[localBot];
    7           oldAge = age;
    8           if(localBot > oldAge.top)
    9             return wkt;
    10          bot = 0;
    11          newAge.top = 0;
    12          newAge.tag = oldAge.tag + 1;
    13          if(localBot == oldAge.top) {
    14            cas(age, oldAge, newAge)
                  if(oldAge == newAge)
    15              return wkt;
                  }
    16          age = newAge;
    17            return NULL;
              }
```

To pop a queue entry, the owner thread first reads the bottom index bot, as in line 1 above. When the queue is in its initial, unpopulated state, the bottom index has an initial value, call it zero, that represents the start of the space allocated to queue entries. If the bottom index's value is zero, as in line 3 above indicates, then the owner thread concludes that its queue is empty and the routine indicates this by returning NULL. The thread in response thereto attempts to steal from another thread's queue. Otherwise, if the queue is not empty, the owner thread decrements the bottom index's value and pops is the queue location to which the decremented bottom index points, as lines 4 to 6 above indicate.

But a stealing thread may have popped an entry from that location, because the bottom popping location is one location above the one at which bottom pushing occurs, so the stealing thread's comparison of top index does not prevent it from popping the same entry as the owner thread. The owner thread must check the top index's value before it performs the task represented by the entry that it has read. If the top index's value plus one is less than the bottom index's, the owner thread considers the pop operation a success and proceeds with the task.

If the top index's value plus one is not less than the bottom index's, then the owner thread has read the last queue entry, so it sets the bottom index to zero so that any new entry will be placed at the beginning of the queue space rather than unnecessarily continuing the queue contents' downward progression. It also sets the top index to zero, but two factors complicate the way in which it does so.

The first factor is that the owner thread needs to determine whether a stealing thread has popped the entry the owner has just read. If, as tested in line 13, the value that the owner thread read for the top index represents a location lower than the one represented by the bottom-index value 34 it read, then a stealing thread clearly has already popped the queue entry that the owner thread read, so the owner thread simply sets the top index to zero, as lines 11 and 16 indicate, and turns to stealing without performing the task that the entry represents. On the other hand, if the values the owner read for the top and bottom indexes were equal, then the queue entry it read may not already have been popped by a stealing thread. If that entry has not been popped, the owner thread should perform the task that it represents.

To determine whether the entry has been popped, the owner thread performs line 14's atomic compare-and-swap operation, in which it sets the top index to zero if the value of age before the swap is still what it read previously, i.e., if no intervening popping of that last queue entry has occurred. If that compare-and-swap operation is successful, the owner thread performs the queue-entry-indicated task that line 15's return value represents. Otherwise, it still sets the top index to zero, as line 16 indicates, but it turns to stealing in response to line 17's NULL value: it does not perform the task whose identities it read from the queue.

The second complicating factor brings us to the reason for the tag field. As was just explained, the owner thread resets the indexes to point to the top of the queue space when the queue empties. Not only could this occur while a stealing thread is suspended in the act of stealing, but the owner could also bottom push the queue enough to fill this queue back up to where it was when the stealing thread's suspension began, and other stealing threads could restore the top index to the value originally read by the suspended thread. For example, when an empty queue has one element pushed onto its bottom, and then a steal attempt occurs, the stealing thread could read the top index and associated task, but the owner thread could then pop that task, process it, and push a new task. In this example, the top index was originally zero, so no "help" from other stealing threads is required to return it to its original value. If, as described above, the stealing queue tested for intervening accesses by comparing only the top index value with the one it used to read the queue entry, it would fail to detect the intervening accesses' occurrence, and it would perform the task unnecessarily and improperly.

Therefore, the tag field of the new age value with which age's controlled or replaced in line 14's or 16's step will have been incremented, as line 12 indicates.

To enable the stealing thread to guard against this, the owner thread increments the tag value when it resets the top index to zero. Then, when the stealing thread checks for intervening accesses, it compares that whole word with what it was when it read the queue entry. So, even if the top entry seems not to have changed, the change in the tag value will alert the stealing thread to the intervening access, and it will not inappropriately perform the indicated task.

The foregoing sample code was simplified in, among other things, that it assumes an unlimited queue size. In some implementations, the queue size may be limited and subject to overflow. In order to avoid using more memory for an overflow list or table, the present invention creates an overflow data structure, used by all threads, that takes advantage of the class pointer in the object structures used by most object-oriented languages such as the JAVA programming language. As will be discussed presently, the collector uses that pointer to link overflowed objects by replacing the class pointers with pointers to other objects on the overflow list.

In operation, before references from a newly scanned-object are pushed onto a work queue, the thread checks free space to see if pushing another object pointer onto its queue would overflow the queue. If so, with reference to FIG. 4d, the thread first obtains a lock on the overflow data structure. When a thread obtains the lock, only that thread has control of the overflow data structure. The particular lock mechanism, several of which are known in the art and can be used for this purpose, is not critical.

Figure 4D:
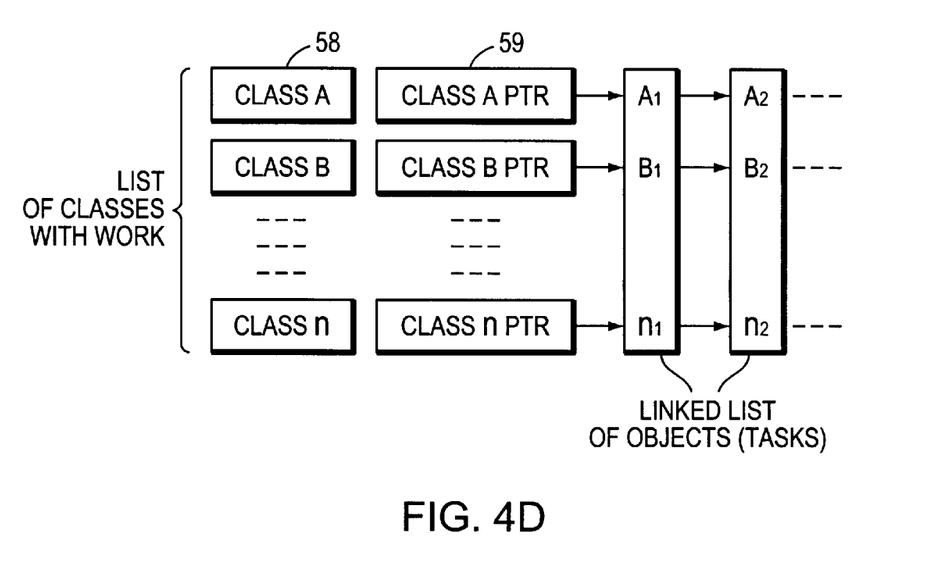

Still referring to FIG. 4d, when the thread has obtained the lock on the overflow structure it proceeds to remove half the identifiers from the bottom of the queue, one at a time, and place them on the overflow list 58, in a manner that will now be described. The overflow data structure is a table in which each entry includes a class identifier 58 and a class pointer 59 that points to a linked list of objects representing tasks in the overflow list. To add a task to the overflow list, the thread reads the class field of the object that represents that task, and it thereby determines the object's class. If the overflow data structure does contain an entry that represents that object's class, the thread adds the task at the head of the list. It does so by writing into the class pointer a pointer to the new task, and replaces the class pointer in the new task with the pointer task that was previously in the class pointer. So the result is that the class pointer points to the new task and the new task class pointer points to the task that was previously at the head of the list. The overflow objects are listed by class so that during retrieval the proper class pointer can be re-installed in each object's header.

In some embodiments, the overflow data structure may be efficiently represented by storing a class's list of overflow objects directly in the class data structure, and maintaining the set of classes with non-empty overflow lists as a linked list of class data structures, threaded through another field of the class data structure.

If the overflow data structure has no entry that represents the object's class, the thread adds such an entry to that structure and adds a corresponding pointer 59 to the object as the first instance on the overflow list of a task representing object of this class. The thread also NULLs the class pointer in the object's header. This NULL remains since the first task on the overflow list in a class becomes the last task when other tasks are added in front of the first task. The NULL is used to indicate the last task in an overflow list for a class.

When a thread has exhausted its queue, it obtains a lock on the overflow data structure, and retrieves a number of the objects at the beginning of the list. In doing so the thread must replace the class pointer to point to the tasks not retrieved to maintain the linked list. In one preferred embodiment, the thread may retrieve enough objects to fill half of its queue, but other amounts may be retrieved. The retrieved objects are pushed onto the bottom of the queue. If half a queue's volume is retrieved, and this queue were to overflow again, the retrieved objects will be in the top half of the queue and hence those retrieved objects will never be placed again on the overflow list.

In most applications overflow occurs rarely, so that the delay in handling overflows will not appreciably slow down the collection operation.

Figure 5A:
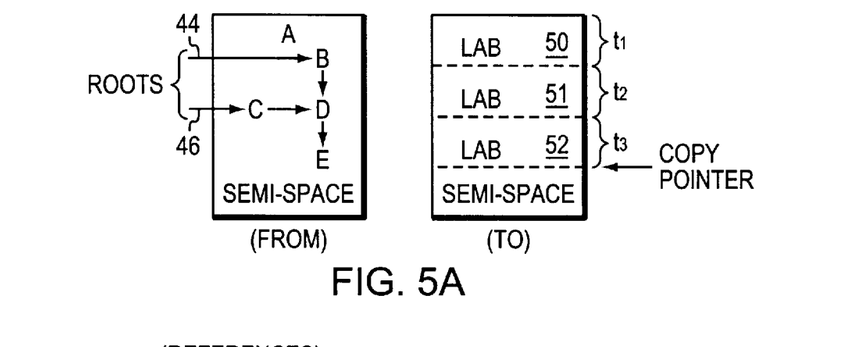
FIGS. 5a–5d are block diagrams of the organization of the young heap.

As referenced above, the young generation is split into two equal sized semi-spaces, marked "from" and "to," as illustrated in FIG. 5a. As shown in FIG. 5a, root 44 points to object B, and root 46 to object C in the "from" semi-space, and the task is to copy B and C and their references into the "to" semi-space.

Since the thread handling the copying of B and the thread handling the copying of C operate asynchronously, they will be contending for writing into the still-unused portion of the "to" space. That contention must be resolved. As discussed several places herein, atomic hardware primitive instructions (e.g., CAS) are used to update the pointer delimiting the bottom of this unused portion. However, contention for this pointer might occur too frequently, and unacceptably slow the GC operation. In order to address this particular issue, with reference to FIG. 5a and 5b, GC threads allocate local allocation buffers (LABs) in "to" space. The allocation of LABs uses atomic hardware instructions, but only the allocating thread can allocate within and copy into a LAB that it owns. So less expensive non-atomic instructions suffice for allocation within a LAB. In subsequent copying operations, thread t1 copies into LAB 50 until LAB 50 no longer has enough room left to receive the next object.

Figures 5B, 5C, 5D:
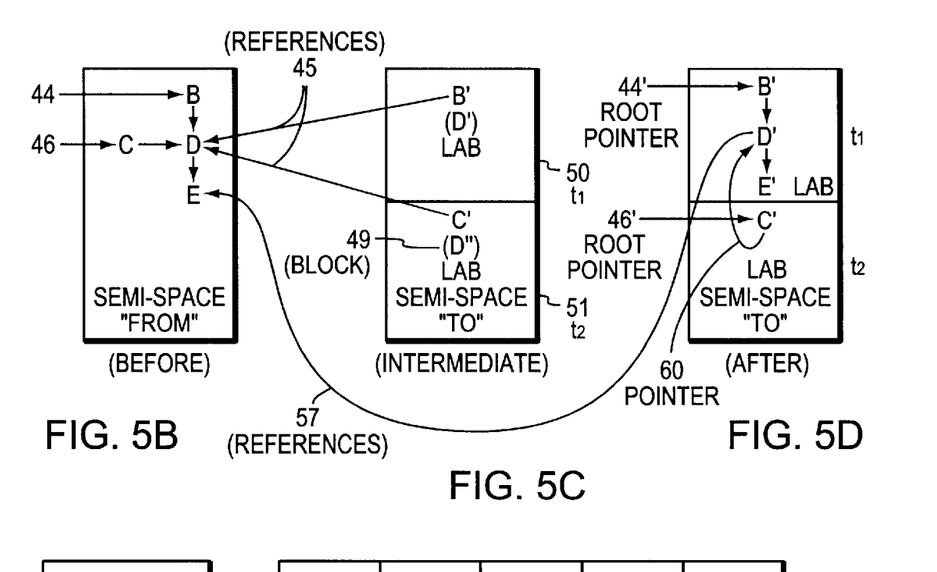

The thread allocates another buffer and fills the remaining space in the old buffer with a "dead object", such as an array of integers, that benignly occupies the remaining area. Such a benign object contains information in its header that allows any program that accesses the dead object to know where the next object, i.e., the first one in the next LAB, begins. This preserves the heap as a contiguous area. Thread t1 then allocates a fourth LAB in the same manner. In the interim, threads t2 and t3 may have allocated LABs 51 and 52, as shown.

Each LAB may be set up with individual copy pointers that are used similarly to the global one mentioned above, but without requiring the use of atomic primitive instructions, to control and organize the storing, without interference, of objects in that buffer. Each LAB is designed to be large enough to reduce contention for the copy pointer but small enough to keep fragmentation of the young generation's storage space acceptably low. The actual sizes will depend on the applications involved. In some preferred embodiments, a single LAB may contain many megabytes.

FIGS. 5b, 5c, and 5d show the before, intermediate and after, respectively, conditions as threads copy objects from a "from" memory into LABs in a "to" memory. The arrows in these Figures are pointers. Thread t1 copies B to B' and updates the root pointer 44', and, asynchronously, t2 copies C to C' and updates the root pointer 46', both operations as shown in FIGS. 5c and 5d. With reference to FIG. 5b, thread t1 scans B', and t2 scans C', finding both with a reference 45 to D, and both speculatively allocating blocks D' and D" within their respective LABs, as illustrated in FIG. 5c. So D must be copied and the proper pointers installed in B' and C'. In the sequential (non-parallel) version of the copying collection algorithm, the object is copied when the first reference to it is scanned, and a "forwarding pointer" is installed in its old location so that subsequent references to the object can be updated to the new location. It is possible to distinguish an object with an installed forwarding pointer from one without a forwarding pointer. In the scenario just described, threads t1 and t2 both read the word in D that would contain the forwarding pointer and observe that none is present. In order to resolve the contention between t1 and t2 for who is to copy D, both t1 and t2 attempt a CAS instruction to insert the forwarding pointer in D. The instruction CAS (addr, old, new) atomically compares the contents of "addr" with the value "old", and, if they agree, sets the contents of "addr" to "new". In this use, the "addr" is the address of the forwarding-pointer word of D; the "old" value is the non-forwarding pointer value both threads read, and the new values for threads t1 and t2 are the new addresses D' and D", respectively. Only one of these CAS instructions will succeed and only the thread performing the successful CAS will actually copy D. That thread copies D to its new location, and the other thread updates its references to that location. In this case, say that t1 does so first. Thread t1 copies D to D', updates the reference in B' 55 and leaves behind in the location of D a forwarding pointer. With reference to FIGS. 5c and 5d, thread t2 is second to execute its CAS on D, but t2 finds that another thread has handled D since the newly written forwarding pointer in D will not match that in the CAS instruction executed by t2. However, t2's CAS operation returns the newly written forwarding points to D', and, so, t2 updates the reference pointer 60 in C' to point to D' and de-allocates the block D" 49 that was previously allocated for copying D by t2. Thread t1 finds a reference 57 in D1 to object E. and copies E to E' again leaving a forwarding pointer in location E and updating the pointer in D' to point to E' 59.

Figure 6:
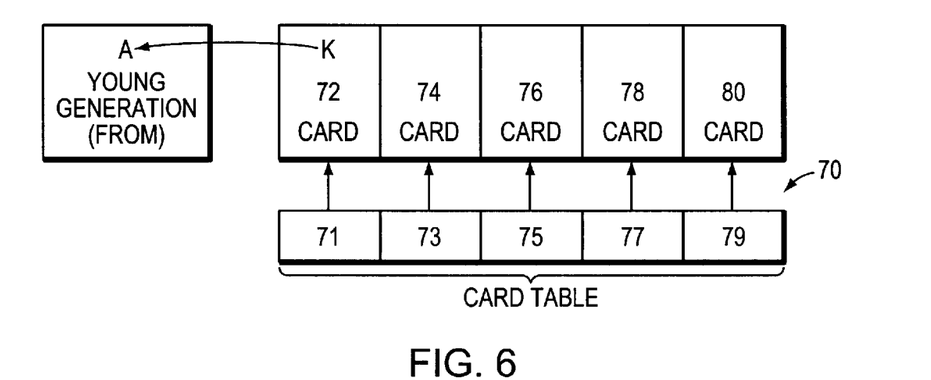
FIG. 6 is a diagram of a card table heap relationship.

When the GC collects the young generation, the root set includes references in the old generation to young generation objects. One approach would be to inspect all references in the old generation at the beginning of every GC cycle, and this approach may be feasible for certain applications. But such an implementation is too slow for many applications. Another, faster approach includes "write barriers" in the mutator process, and a "remembered set" data structure. The remembered set records the locations of previously identified cross-generational references. A "write barrier" identifies and records possible modifications to references that have been made since the prior collection cycle. Only these modified references may contain newly created cross-generational references. The collections become faster because the remembered set and the write barrier direct the collector only to those places in the older generation that may contain previously existing or newly created references to young-generation objects One approach for implementing the above technique is to build what is known as a "card table." FIG. 6 depicts the old generation partitioned into physical segments called "cards," 72, 74, 76, 78, and 80. For each "card" there is a respective entry in the card table 70, where entries 71, 73, 75, 77, and 79 are associated with cards 72, 74, 76, 78, and 80, respectively. The card table entries are, in this embodiment, made by the write barrier code in the mutator. That code sets card table entries to identify their respective cards as possibly containing pointers to the young generation. One example of the information that may be found in the card table entries is: empty, meaning there are no young generation references in the respective old generation partition; modified, meaning that there may be references therein; or summarized, meaning that offsets to the references are contained therein. FIG. 6 shows that a reference 76 exists from object K in old generation card 72 to object A in the young generation. The possible existence of this reference would be indicated by the contents of card table entry 71. Since the organization of the old generation is fluid and the objects do not necessarily start and stop at the card boundaries, the entry in the card table contains an offset with respect into the start of the card. That offset indicates the starting point of an object that might straddle a card boundary. (Thus, the card table both embodies a remembered set and is used by the write barrier to track modified references.)

At the beginning of a collection cycle, the card table is scanned to find non-empty old-generation cards. Summarized cards contain young-generation references found in the previous collection cycle. Modified cards may contain young-generation references created since the last collection; when these cards are examined, the corresponding card table entries are set either to "empty" or "summarized", depending on whether or not young-generation references were found. So that different processors can perform parts of this operation, the collector divides the card table into partitions, and each thread claims different partitions and finds references therein that point to the young generation.

In practice it has been found that old objects that reference young objects may tend to crowd into adjacent memory cards rendering those very densely populated with objects needing processing. For this reason, when a series of adjacent card table entries indicate that the corresponding adjacent old generation cards must be scanned for young object references, the threads are arranged to scan an old generation card and then to skip a number of cards before scanning another. In one embodiment, partitions are formed of two cards separated by seven other cards. Consider that there are eight threads where each thread skips the seven intervening cards being handled by the other seven threads. In other preferred embodiments, the number skipped may be different or even unrelated to the number of threads. By handling the cards in this card skipping or card striding manner, more threads will share in the processing of densely populated regions.

The following illustrates the advantage of the above process. When a card table entry indicates that the corresponding card must be scanned, the work task involved is to find those objects in the old generation with references to objects in the young generation, and subsequently scan those young objects for further reachable young generation objects. Since these work tasks could be time consuming, the above parallelization works to share the work with all the available threads which speeds up the collection process.

The assignment of card partitions to threads is accomplished by competition among the threads. However, in other embodiments, the card partitions may be simply assigned. As discussed previously, an atomic set-and-test operation in claiming a card group resolves contention. A flag bit is associated with each card partition and a thread interrogating that bit with the test-and-set instruction will be successful or not and process the card partition or go on to compete for another.

In a preferred embodiment, when an object survives a given number of young generation collection cycles, usually 3 or 4, that object is not copied to the "to" semi-space but is moved to the old generation. The GC maintains a pointer to free area(s) in the old heap and copies the object to one such location. As always, when an object is moved, a forwarding pointer is installed in its old location, and that pointer is used to update all other references to the object to point to the correct new location.

The old generation will be subjected to a garbage collection when such an addition to the old generation will overflow the old generation, or, in other embodiments, other criteria may be used to trigger a GC cycle. GC in the old generation will occur substantially more rarely than in the young generation.

Figure 7:
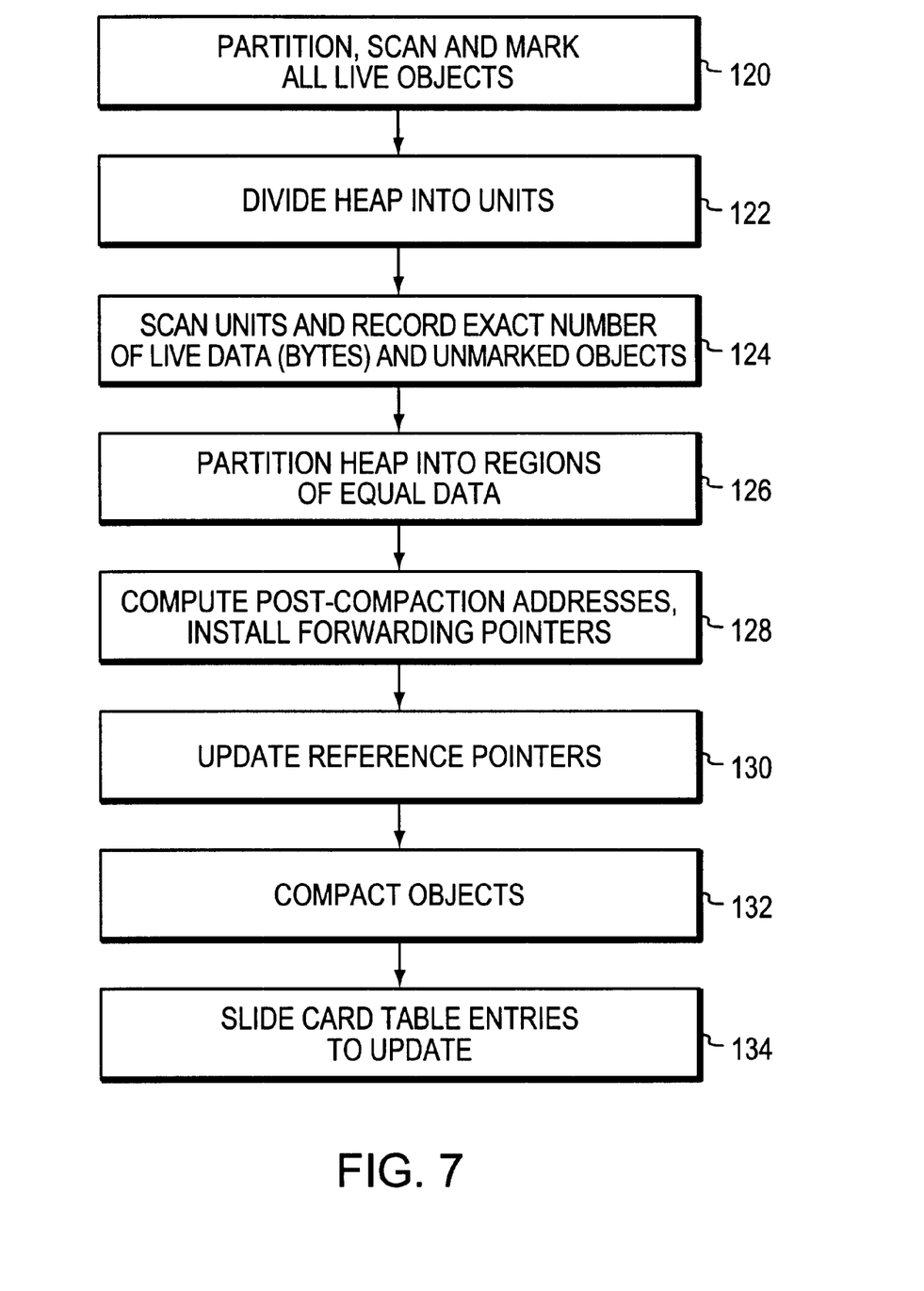
FIG. 7 is a flow chart depicting collection of the old generation.

As mentioned above, for large heaps it may be inefficient to use the "from" and "to" semi-spaces since one is empty. The approach to old generation collection in this embodiment is based on the known "mark-compact" type collector, except the present invention adds parallelization to the mark-compact process. This operation includes the general steps, described in more detail below. With reference to FIG. 7, the steps include: marking the live objects; sweeping the heap to discover unmarked objects and count the live data; calculating where parallel compaction will move objects and installing the resultant forwarding pointers 128; updating pointers 130 to the live objects; and compacting the live objects and adjusting the associated card table 132, 134.

With reference to FIG. 7, item 120 the GC in parallel marks all the live objects in the heap by statically partitioning the root set into a number of segments usually larger than the number of threads. The segments are assigned to the threads. The threads scan the segments for object references. Referenced objects not already marked live are marked, and pointers thereto are pushed onto, the thread's work queue, to indicate the pending task of scanning that object for references to other objects. After pushing an object reference on the queue, the thread may immediately pop and process the scanning task (which may in turn identify more such tasks, and so on), or it may continue scanning the root for object references. This choice might be made dynamically, depending on how full the thread's work queue is. When the scanning of the root for references is complete, then, the threads' tasks are to pop each succeeding object from their respective queues, to mark the live objects by setting a bit in the objects' headers, and to scan the object for other references. When other references are found, those objects are marked and scanned for yet further objects. The thread continues until all the objects and their references along a reference chain are marked. When a thread has exhausted its work queue of objects to be marked, the thread will steal from other threads, as discussed above with reference to FIGS. 4a–4e.

Once all the live objects are marked, the heap is again partitioned 122 into a number of "units" greater than the number of GC threads, again to provide a parallelization of the GC. In one embodiment, the number of units is four times the number of threads, but a finer-grained partitioning into more units may be used to advantage. In the fashion described before, each thread dynamically competes for and claims a unit to process by using atomic instructions accessing a flag. When a thread has control of a unit, it sweeps the unit coalescing consecutive unmarked objects into single free blocks, and records the number of bytes 124 occupied by live objects in the unit. When a thread completes a unit, it goes on to compete for other units until all the units have been scanned.

Once the exact amount of live data is known, the heap is partitioned once more 126 into as many new "regions" as there are threads, wherein each new region contains substantially equal amounts of live data. Each region is composed of an integral number of units, whose live data occupancy was computed in the previous pass, allowing the amount of live data in the regions to be balanced. This balancing is important because the region partition is used to parallelize the compaction phase, where cost depends on the amount of live data copied to new locations.

Before compaction, however, post-compaction addresses and corresponding forwarding pointers are installed 128 and all object references are updated 130 so that they will be correct after compaction. Since the region boundaries are known, and the number and locations of the objects and the direction they are to be compacted within each region are also known, the threads can compute the address each object will have after compaction, and install a forwarding pointer to that address in each object before the compaction occurs.

With reference to FIG. 7 step 130, object pointers to old generation objects must be also redirected to the new addresses. Such pointers may occur in a number of different locations: in roots, in objects in other generations, and within objects in the current generation. These pointers occurring in items outside the current generation may be partitioned to equal the number of threads and each partition assigned to a GC thread, and pointers in items within the current generation are partitioned using the over partitioning approach discussed above.

The last two operations in this sequence are to actually compact 132 the objects and then to update 134 the card table entries, item 70 of FIG. 6, to retain the indicators of old memory partitions having objects with references into the young generation.

Figure 8:
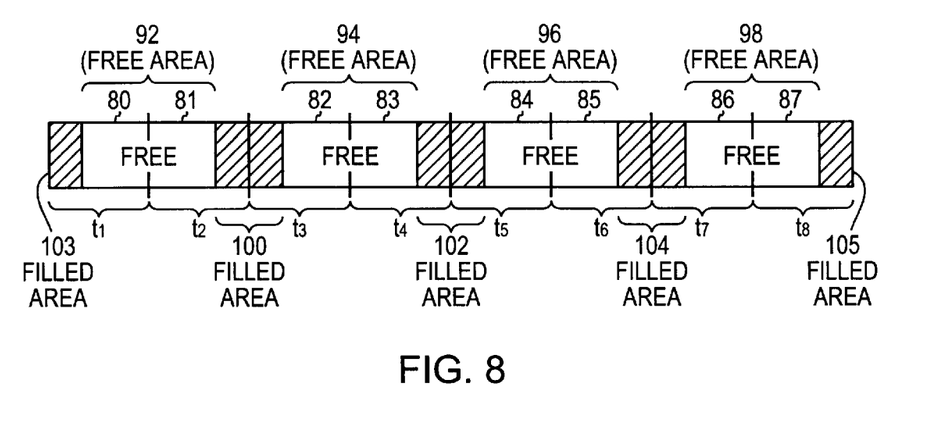
FIG. 8 is a diagram of compaction in the old generation.

FIG. 8 shows the resulting compaction of the old generation objects in a preferred embodiment where there are eight sections 80, 81, 82, 83, 84, 85, 86, and 87 each being is compacted by the respective threads, T1, T2, T3, T4, T5, T6, T7, and T8. Each thread is assigned a partition to compact as shown. In compacting, alternate threads move the live objects in opposite directions. For example, the directions 88 and 90 of adjacent partition 80, 81 work to form a contiguous free area 92 adjacent to a contiguous filled area 100. In this way the old generation GC creates a series of spaced free regions 92, 94, 96, and 98 bordered by a series of contiguous filled regions 100, 102, 103, 104, and 105.

In FIG. 8, the compaction produces four separate free areas because the memory was divided into eight regions. The general rule is that the memory when divided into n regions, and when compacted as described above, will provide a number of contiguous free areas equal to the greatest integer less than or equal to (n+1)/2. So eight regions provide four free areas, and nine regions will provide five free areas. Although these free areas are not contiguous, in many applications, a small number of free areas are as useful as one large free area.

Figure 9A:
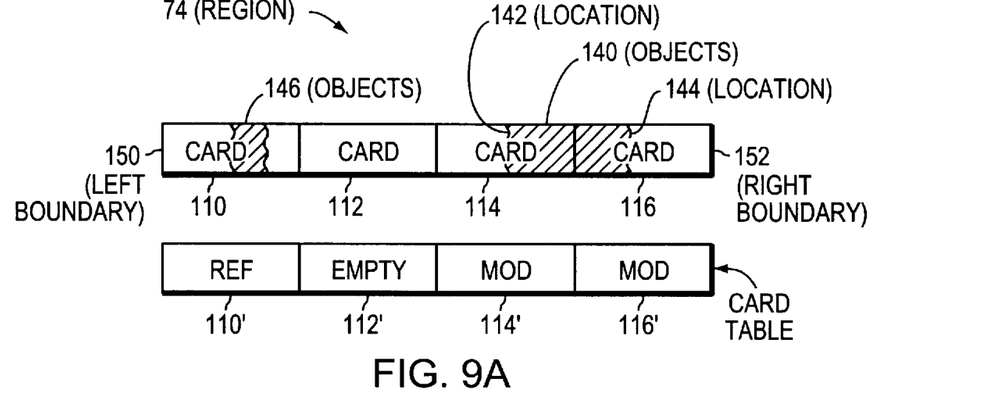
FIGS. 9a–9c are diagrams of updating card table entries associated with old generation compactions.
Figure 9B:
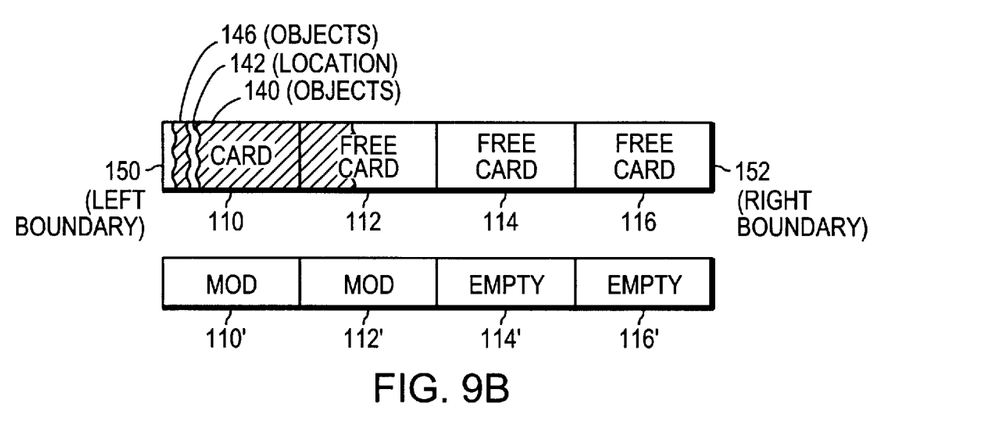
Figure 9C:
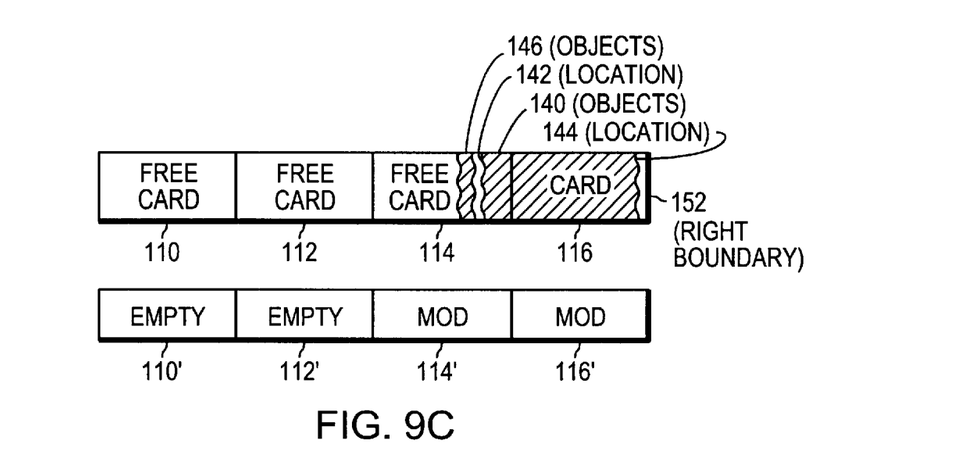

Since the old generation has been compacted as discussed above, the card table entries indicating those parts of the old generation having references into the young generation must be realigned with the newly compacted old generation. The technique is to "slide" the card entries as shown in FIGS. 9a, 9b and 9c. This technique is illustrative and can be applied to memories that are organized and/or divided differently.

FIG. 9a shows a particular region 74 of FIG. 6 before it is compacted. For illustration purposes, the region is divided into four cards 110, 112, 114, and 116, with card table 73 having four corresponding card entries. Say that this region is to be compacted toward the left as shown in FIG. 9b, and as was done in regions 80, 82, 84, and 86 in FIG. 8. Referencing back to FIG. 9a, there are objects 140 that extend from the location 142 in card 114 to location 144 in card 116. The edges of the objects and the cards are not necessarily aligned. Also, there are objects 146 in card 110. In the accompanying card table 73, there is a "mod" entry 114' that indicates that the associated card 114 contains objects that have been modified, so one or more of those objects may have references into the young generation. The same circumstances are shown for card 116 and its card entry 116'. Card 112 is empty 112'. However, card table entry 110' has "ref" meaning that one or more objects in card 110 have references into the young generation, and that nothing was changed in section 110. In the circumstances shown, the write barrier (discussed above) would not mark card 110 and the card table entry 110'.

When portion 74 is compacted to the left, across the empty card 112 and into 110, the associated card entries must also be moved left. The result is shown in FIG. 9b, where the objects 146 are moved to the left boundary 150 of card 110 and the objects 140 are moved left abutting 146. Here cards 114 and 16 are free space. The card table entries are modified where the effect is that the "mod" entries in 114' and 116' have moved left by as many cards as the left boundary 142 has moved. Card table entries 114' and 116' are now marked as empty. Now when the card table is scanned for cards to search for entries into the young generation cards 110 and 112 will be searched.

If the region 74 was to be compacted to the right, as shown for regions 81, 83, 85, and 87 in FIG. 8, the operation is shown with the result shown in FIG. 9c. The right edge 144 is aligned with the right boundary 152 of card 116, and the left edge 142 remains in card 114. Meanwhile, the object 146 is moved right abutting edge 142 as shown in FIG. 9c. Here card table entries 116' and 114' show "mod" indicators as before, and so the cards 116 and 114, respectively, will be searched (including 146) for references into the young generation, and, card table entries 110' and 112' will now be marked empty.

In the above operation, if the card table entries were summaries showing the addresses or offsets of live objects into the respective sub-regions, those addresses arid offsets are known. Since, the compactor knows where the objects are and where they will finally reside; it can calculate new addresses and/or offsets into the proper card table entries.

Figure 10:
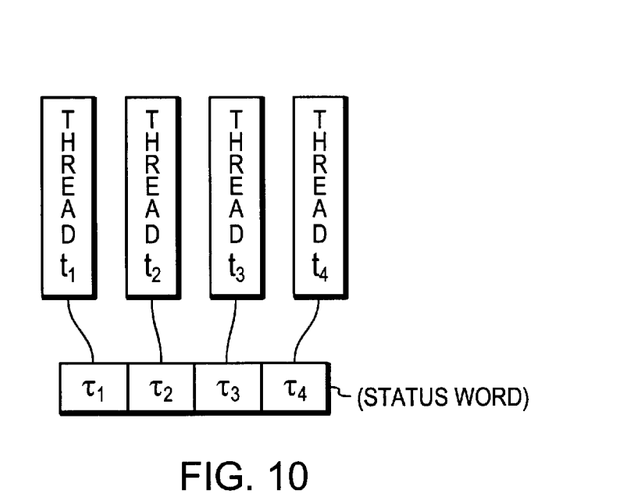
FIG. 10 is a block diagram of the termination organization.

The description so far has described a method of dividing among threads the various tasks dynamically identified during part of garbage collection cycle, and it has given examples of garbage collection process parts that may use such a method. Since such a part of the cycle identifies tasks dynamically, there must be some way for a thread to determine when no further tasks remain in that part of the cycle. FIG. 10 illustrates one way to make that determination.

FIG. 10 shows four thread work queues, T1, T2, T3, and T4, and a global status word 140 containing a bit for each thread. If a queue is not empty, the corresponding status bit is set to active. This indicates that the associated thread has work remaining. If the thread runs out of work, it makes two times the number of threads attempts to steal. If unsuccessful, the thread sets its status bit to inactive, and then checks the status bits of all the other threads. If all are set inactive, then the thread terminates the collection. If not all are inactive, the thread randomly selects a thread to steal from, and peeks to see if that thread has work. If so, it sets its status bit active, and attempts to steal from that thread. If successful, the thread processes the work and starts the protocol over again. If unsuccessful, then the thread sets its status bit inactive and randomly chooses another thread to steal from.

Pseudo code for the termination procedure is as follows:

```
/* Try to find a deque with work and steal one item of work */
static java_lang_Object *stealWork(localDeque *dq) {
    globalDeques *gdqs = dq->gdeques;
    int degree = gdqs->numDeques;
    int self = dq->index;
    int iterations = 2 * degree;
    int i = 0;
    while (i++ < iterations) {
        localDeque *dqToSteal = pickQueueToStealFrom(gdqs, dq);
        if(dqToSteal->bot > dqToSteal->age.top) {
            java_lang_Object *obj = (java_lang_Object *)popTop(dqToSteal);
            if(!obj) poll(NULL, NULL, 0);
            else return obj;
        }
    }
    return NULL;
}
/* Look for work in the overflow list. If you don't find it,
   try to steal work from another thread */
static java_lang_Object *findWorkHelper(localDeque *dq) {
    java_lang_Object *obj = findWorkInOverflowList(dq);
    if(obj == NULL) {
        obj = stealWork(dq);
    }
    return obj;
}
/* Peek to see if any of the other threads have work. */
static bool_t peekDeque(localDeque *dq) {
    globalDeques *gdqs = dq->gdeques;
    int degree = gdqs->numDeques;
    int i;
```

```
        for(i = 0; i < 2 * degree; i++) {
            localDeque * dqToPeek = pickQueueToStealFrom(gdqs, dq);
            if(dqToPeek->bot > dqToPeek->age.top) {
                return TRUE;
            }
        }
        return FALSE;
}
/* Check to see if there is any work on the overflow queue
or if any of the other threads have work that may be
stolen */
static bool_t checkForWork(localDeque *dq) {
    globalDeques *gdqs = dq->gdeques;
    return gdqs->classesWithWork || peekDeque(dq);
}
/* Find work. If you can't mark yourself inactive and
    keep checking */
java_lang_Object *dequeFindWork(localDeque *dq) {
        java_lang_Object *result = findWorkHelper(dq);
        globalDeques *gdqs = dq->gdeques;
    if (result == NULL) {
        mark_self_inactive(dq->index, &gdqs->statusBitmap); /* You don't have any work
*/
    }
    while (result == NULL) {
        if(!gdqs->statusBitmap) return NULL; /* No one has any work. Terminate. */
        poll(NULL, NULL, 0);
        if(checkForWork(dq)) { /* You don't have any work, but there is some either
                                on the overflow queue, or in another threads work
                                queue */
            mark_self_active(dq->index, &gdqs->statusBitmap); /* Looking for work */
            result == findWorkHelper(dq);
            if (result == NULL) {
                mark_self_inactive(dq->index, &gdqs->statusBitmap);
            }
        }
    }
    return result;
}
```

Although the invention has been described with respect to various embodiments, it should be realized this invention is also capable of a wide variety of further and other embodiments within the spirit and scope of the appended claims.

What is claimed is:

1. A process for resolving contention among garbage collection threads that are asynchronously contending to copy a same work task located at a first memory address to a second memory address, wherein the contending threads have a pointer to the same work task, the process comprising the steps performed by a first thread of:

formatting the work task to contain its present address, executing an atomic instruction on the work task in the first memory location, wherein the atomic instruction returns the work task's present memory address, comparing the present memory address found in the work task to the first memory address, and if the present memory address and the first memory address are identical, replacing the present memory address contained in the copied and original work task with the second memory address, and copying the work task to the second memory address.

2. The process as defined in claim 1, wherein if the step of comparing finds that the present memory address and the first memory address are not identical, further comprising the step of updating the first thread's pointer to point to the present memory address of the work task.

3. The process as defined in claim 1 further comprising the steps performed by a second thread of:

executing an atomic instruction on the work task in the first memory location, wherein the atomic instruction returns the work task's present memory address, comparing the present memory address found in the work task to the first memory address, and when the present memory and first memory addresses are not identical, updating the second thread's pointer to point to the present memory address of the work task.

4. The process as defined in claim 1 wherein the atomic instruction is a compare-and-swap instruction.

5. A system for resolving contention among garbage collection threads that are asynchronously directed to copy a same work task located at a first memory address to a second memory address comprising:

means for formatting the work task to contain its present memory address, means for executing an atomic instruction on the work task in the first memory location, wherein the atomic instruction returns the work task's present memory address, a comparator of the present memory address found in the work task to the first memory address, and if the present memory address and the first memory address are identical, means for replacing the present memory address contained in the original and the copied work task with the second memory address, and means for copying the work task to the second memory address.

6. The system as defined in claim 5, wherein if the comparator finds that the present memory address and the first memory address are not identical, further comprising means for updating the first thread's pointer to point to the present memory address of the work task.

7. The system as defined in claim 5 further comprising:

means for a second thread to execute an atomic instruction on the work task in the first memory location, wherein the atomic instruction returns the work task's present memory address, a comparator of the present memory address found in the work task to the first memory address, and when the present memory and first memory addresses are not identical, means for updating the second thread's pointer to pointer to the present memory address of the work task.

8. The system as defined in claim 5 wherein the atomic instruction is a compare-and-swap instruction.

* * * * *